United States Patent
Geppert et al.

(10) Patent No.: US 8,204,195 B2
(45) Date of Patent: Jun. 19, 2012

(54) MULTI-CONFERENCING CAPABILITY

(75) Inventors: Birgit A. Geppert, Basking Ridge, NJ (US); Frank M. Roessler, Basking Ridge, NJ (US)

(73) Assignee: Avaya Technology LLC, Basking Ridge, NJ (US)

( * ) Notice: Subject to any disclaimer, the term of this patent is extended or adjusted under 35 U.S.C. 154(b) by 1299 days.

(21) Appl. No.: 11/904,716

(22) Filed: Sep. 28, 2007

(65) Prior Publication Data

US 2009/0086952 A1    Apr. 2, 2009

(51) Int. Cl.
*H04M 3/42* (2006.01)

(52) U.S. Cl. ............... 379/202.01; 370/260; 370/261; 709/204; 709/227

(58) Field of Classification Search .......... 379/202.01; 370/260, 261; 709/204, 227
See application file for complete search history.

(56) References Cited

U.S. PATENT DOCUMENTS

| | | | |
|---|---|---|---|
| 7,185,054 B1 | 2/2007 | Ludwig et al. | |
| 2002/0078153 A1* | 6/2002 | Chung et al. | 709/204 |
| 2005/0078613 A1 | 4/2005 | Covell et al. | |
| 2006/0095575 A1 | 5/2006 | Sureka et al. | |
| 2007/0047715 A1* | 3/2007 | Madhusudan et al. | 379/202.01 |

* cited by examiner

*Primary Examiner* — Quynh Nguyen
(74) *Attorney, Agent, or Firm* — Cozen O'Connor

(57) ABSTRACT

A system and method for providing the capability to simultaneously manage multiple conference calls, move participants in the conference calls from one conference call to another and subdivide or join multiple conference calls together, and the like, wherein a participant seeking to initiate conference calls does so at his or her endpoint by selecting conference call identifiers, where the identifiers identify conference calls to be created. The initiating participant then selects the participants to be associated with the particular calls and confirms the selection. Upon confirmation of the selection, the conference calls among the selected participants are established.

10 Claims, 11 Drawing Sheets

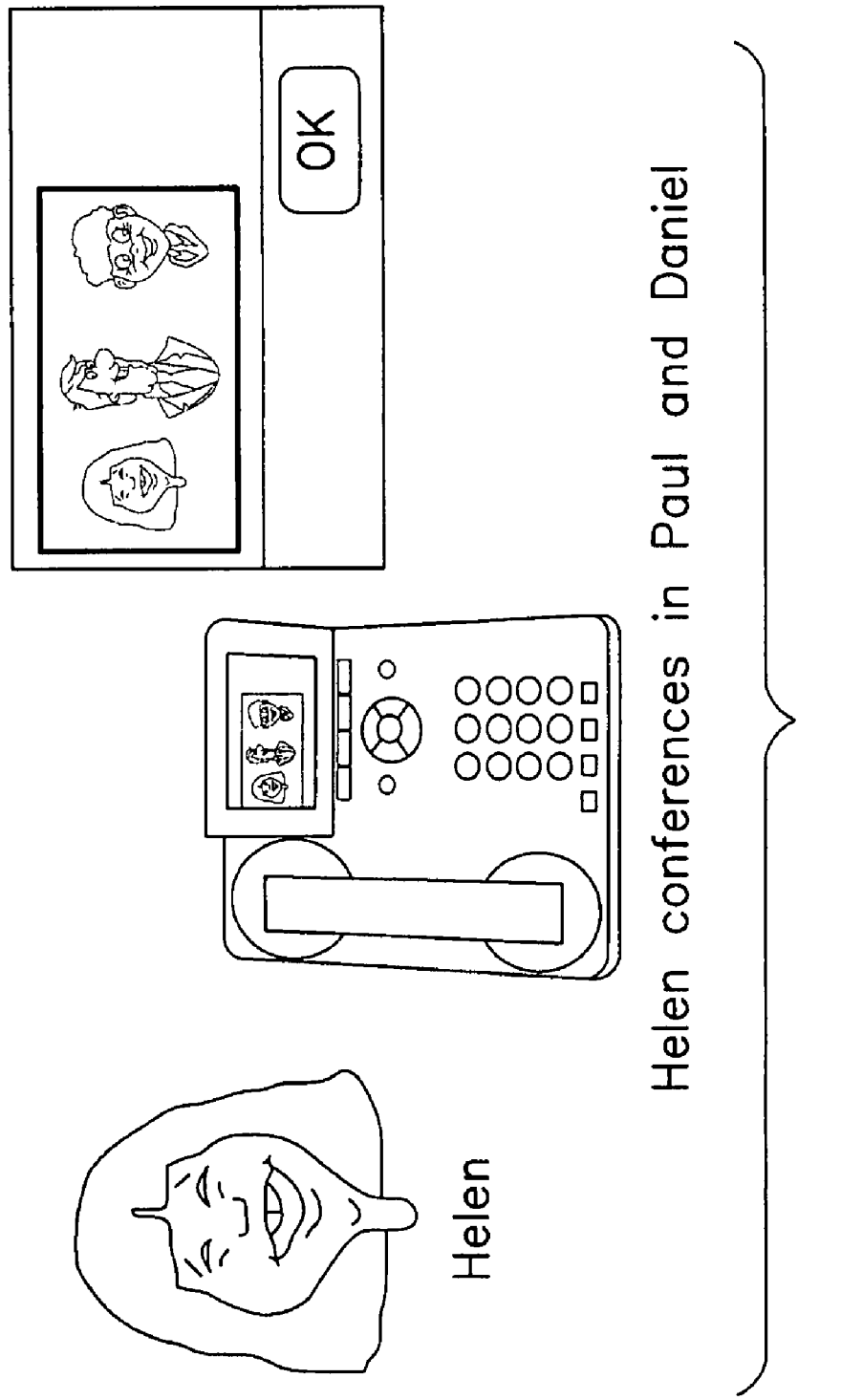

MULTI-CONFERENCE SCENARIOS: CREATED

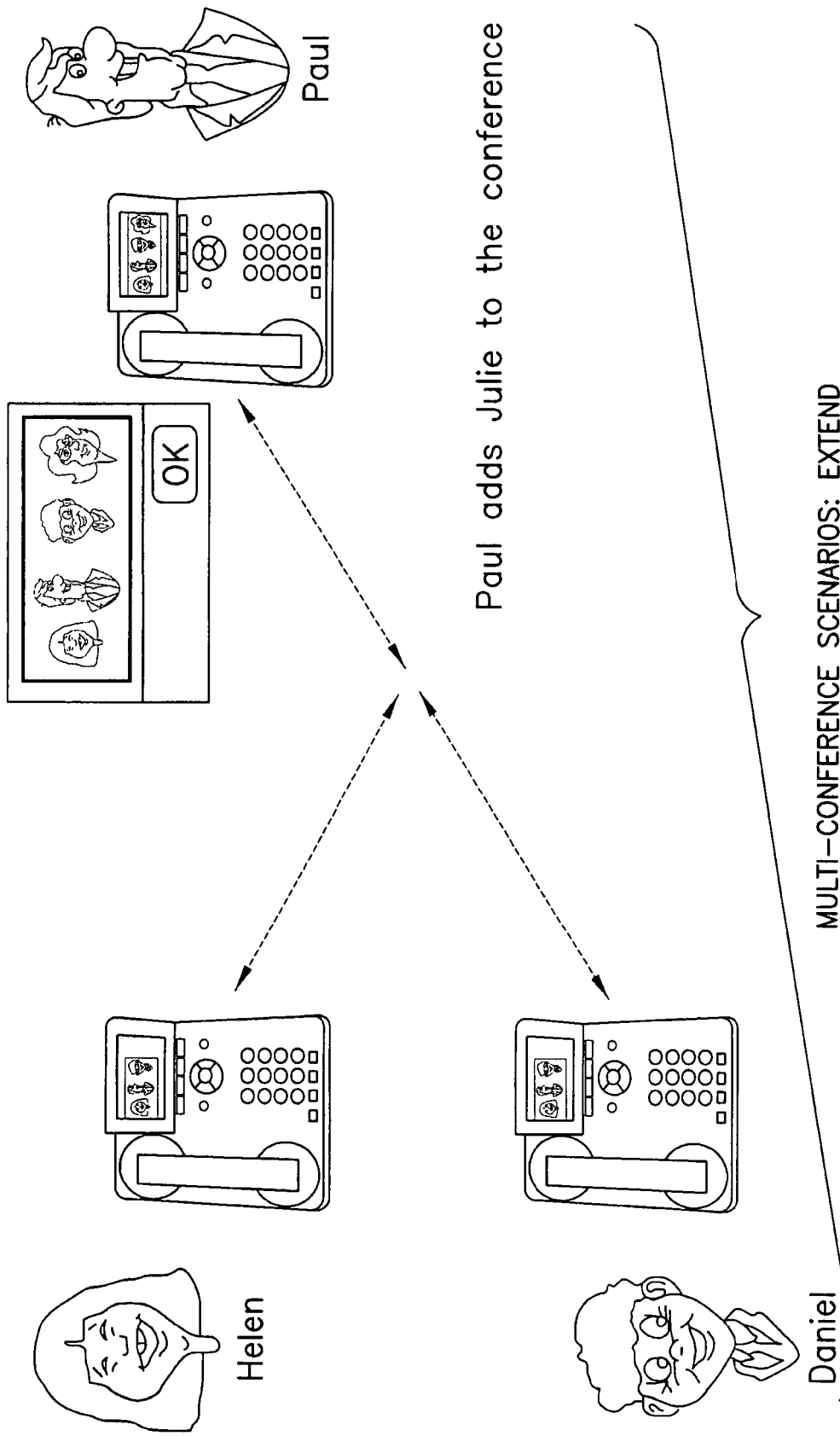

MULTI-CONFERENCE SCENARIOS: EXTENDED

MULTI-CONFERENCE SCENARIOS: SPLIT

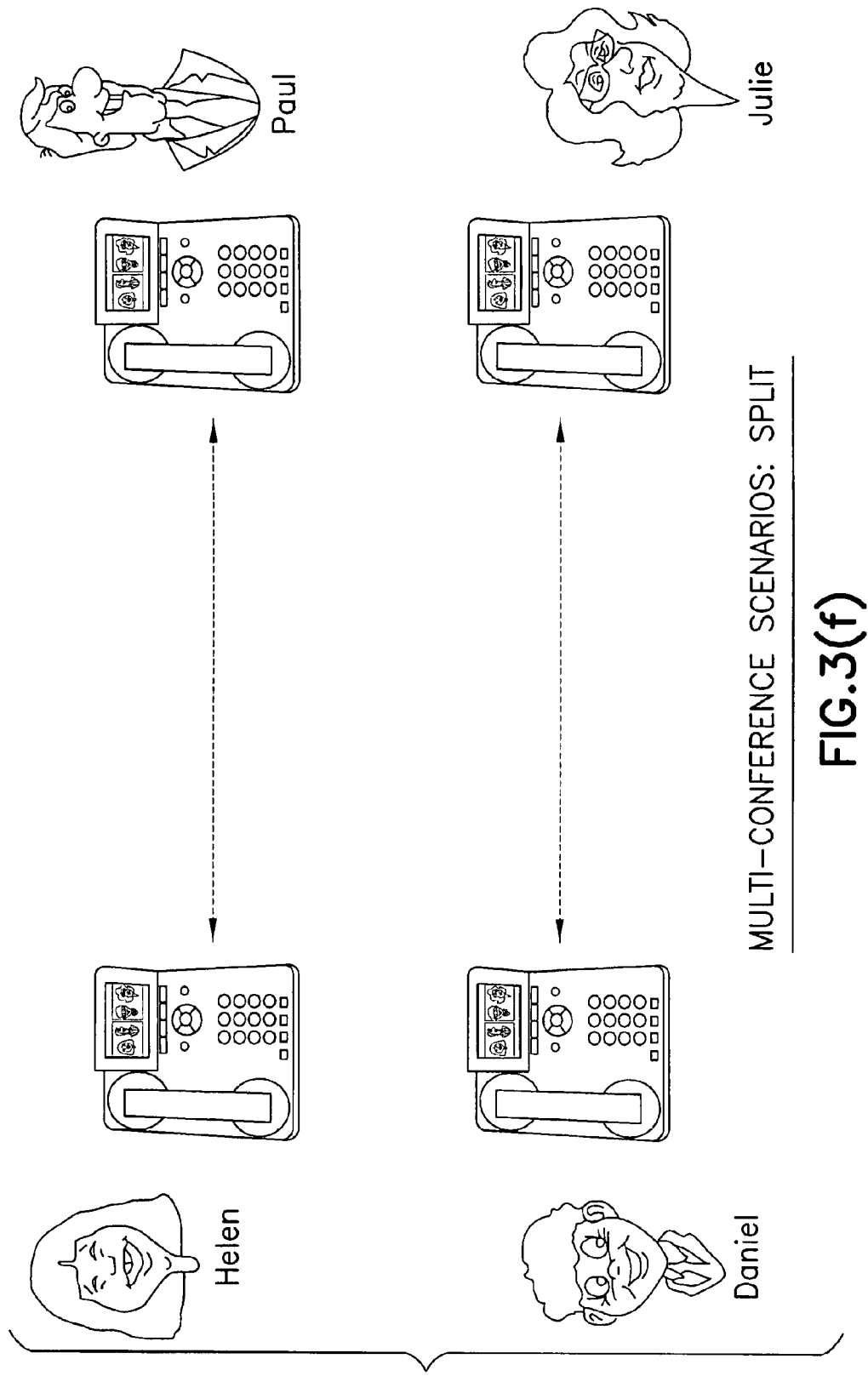
FIG.3(f) MULTI-CONFERENCE SCENARIOS: SPLIT

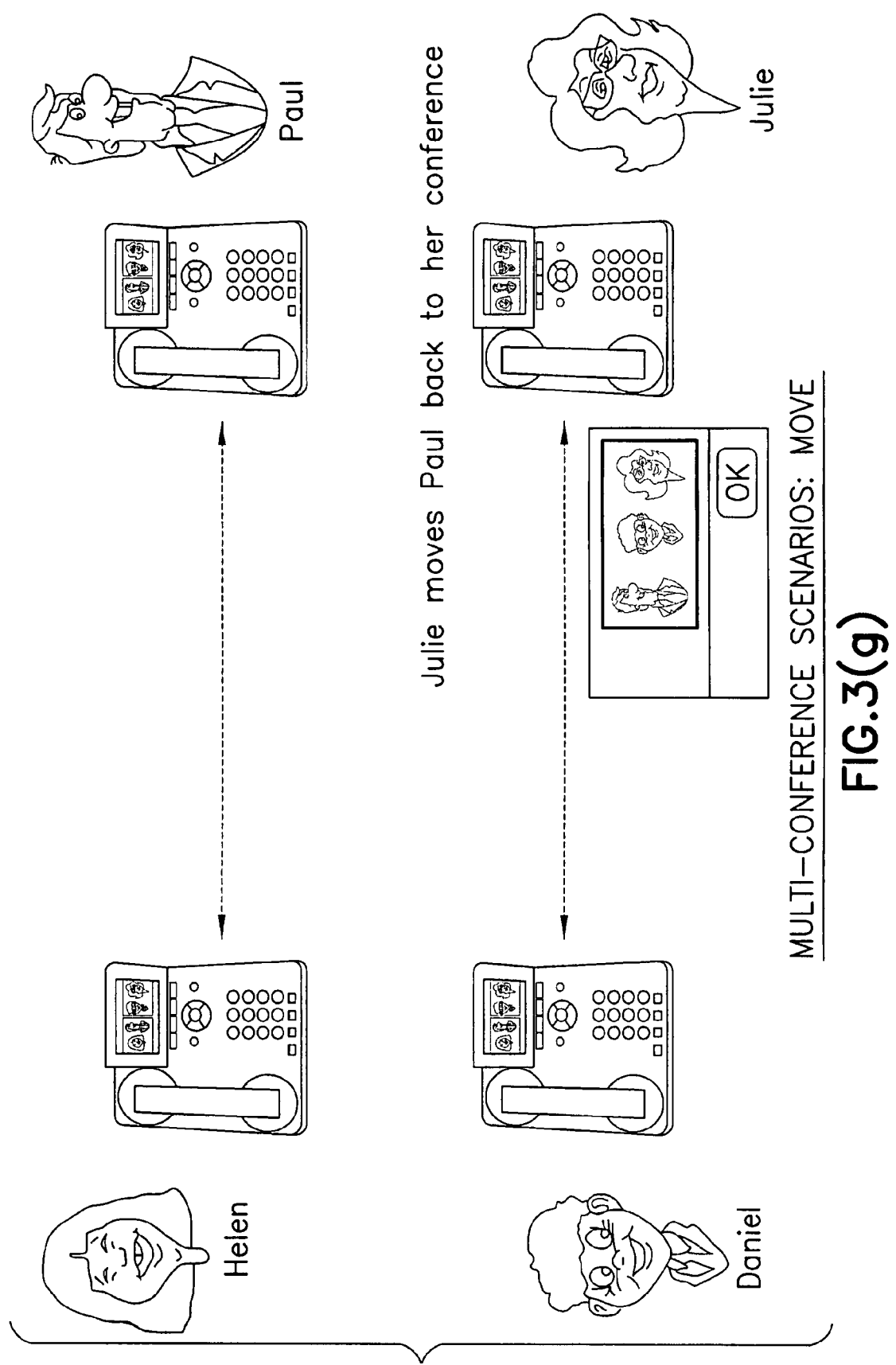

MULTI-CONFERENCING CAPABILITY

BACKGROUND OF THE INVENTION

1. Field of the Invention

The present invention generally relates to the field of teleconferencing and, more particularly, to a method for permitting conference call participants to simultaneously manage multiple conference calls.

2. Description of the Related Art

In a conventional teleconferencing system that utilizes a conference bridge, a group of people individually call the conference bridge assigned to the specific conference for a particular time slot and add themselves to the initial conference call. During the call, a specific participant can remove themselves from the conference bridge, and new participants are able to join the conference call that is currently in progress. When a new participant wishes to join a conference, the new participant will not be informed about who is currently at the bridge, i.e., the new participant will not be provided with the identity of the participants in the conference call. In addition, the conference call participants will not be provided with automatic updates with respect to who is currently participating in the ongoing conference call, i.e., who has joined or left the conference. The only notification that is currently provided is a nondescript audible alert.

If a participant wants to participate in a second conference call, the participant is required to "drop" from the first call and dial into the second conference call. Alternatively, the participant may switch to a second call via their phone (i.e., utilize the conventional call waiting feature) to access the second conference call, while remaining connected to the original conference. However, through all of the foregoing connection cycles, each call has a well-defined "life cycle", which involves a number of steps. First, the conference call is scheduled by a specific person, who then distributes the dial-in information to others who wish to participate in the conference call. Second, conference call participants call and add themselves to the conference bridge to participate in the conference call, and then add themselves to the conference call using the dial-in information provided in the distribution. Next, the user places the call. Finally, the participants in the conference call drop from the call or the allotted time for the call expires. In any event, the end of the conference call does eventually occur. In such a scenario, it is not possible to spontaneously extend the duration of the conference, split up and create a sidebar conference between a subset of participants without having reserved an additional conference bridge prior to attempting to establish the sidebar conference or without needing to call the bridge operator for assistance with setting up the additional conference calls.

In other conventional systems, a caller is able to conference with several people by using his or her calling device as a local conference bridge. However, the number of participants in such a system is typically limited to no more than approximately six participants, where each participant must be added to the conference one after the other. In addition, the conference call itself is still "anchored" to a single, controlling calling device, i.e., the calling device being used as the bridge.

There are no known products or devices that provide features and the ability to control conference calls that would overcome the foregoing limitations of the above-described conventional systems. Accordingly, there is a need for a system and method that provides the capability to simultaneously manage multiple conference calls from the endpoint, move participants in the conference calls from one conference call to another and subdivide or join multiple conference calls together.

SUMMARY OF THE INVENTION

A system and method are disclosed for providing the capability to simultaneously manage multiple conference calls, move participants in the conference calls from one conference call to another and subdivide or join multiple conference calls together. In particular, the proposed system and method provide a multi-conferencing capability that allow one or more teleconferencing participants to manage multiple teleconferences simultaneously from their endpoints.

A participant seeking to initiate a conference call does so at his or her endpoint by selecting a conference call identifier, where the identifier identifies a conference call to be created. The initiating participant then selects the participants to be associated with the particular call and confirms the selection. Upon confirmation of the selection, the conference call among the selected participants is established.

The method of the invention provides symmetric control, in that any participant has at least some control over how the creation and evolution of the conference call progresses. By providing each participant with the capability to control the creation and evolution of a conference call, each participant is permitted to move freely from one conference call to another. That is, each participant at his or her endpoint has the ability to "shape" their conference calls to suit their changing needs during the calls. In other words, each participant may split, merge, add, and delete one or more conference calls that may be in progress. In contrast to traditional sub-conferences, the method of the invention has no constraints with respect to splitting and merging conferences. For example, conferences can be split recursively and the "life-cycle" of a conference that was split-up can continue even though the original conference has ended. In addition, each participant may re-add, re-drop, and remove participants of conferences calls to suit the needs of each of the participants.

The multi-conferencing capability of the present invention permits the management of multiple conferences simultaneously, as well as the splitting and merging of conference calls. In addition, symmetric control at the various participating endpoints is provided, as well as a smooth transition of conference participants from one call to another.

Other objects and features of the present invention will become apparent from the following detailed description considered in conjunction with the accompanying drawings. It is to be understood, however, that the drawings are exemplary and designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The foregoing and other advantages and features of the invention will become more apparent from the detailed description of the preferred embodiments of the invention given below with reference to the accompanying drawings in which:

FIGS. 3(a) thru 3(h) are exemplary block diagrams of an embodiment of the method for conference call participants to simultaneously manage multiple conference calls in accordance with an embodiment of the invention.

DETAILED DESCRIPTION OF THE EXEMPLARY EMBODIMENTS

A system and method are disclosed for providing the capability to simultaneously manage multiple conference calls, move participants in the conference calls from one conference call to another and subdivide or join multiple conference calls together. In particular, the proposed system and method provide a multi-conferencing capability that allow one or more teleconferencing participants to manage multiple teleconferences simultaneously.

In contrast to the previously discussed conventional systems for providing teleconferencing, the multi-conferencing capability provided by the system and method in accordance with an embodiment of the invention, departs from the rigid conference bridge paradigm associated with such conventional systems. Instead, the multi-conferencing of the present invention provides conference call participants with the ability to manage multiple conferences simultaneously. Here, a participant seeking to initiate a conference call does so at his or her endpoint by selecting a conference call identifier, where the identifier identifies a conference call to be created. The initiating participant then selects the participants to be associated with the particular call and confirms the selection. Upon confirmation of the selection, the conference call among the selected participants is established.

The method in accordance with an embodiment of the invention provides symmetric control, in that any participant has at least some control over how the creation and evolution of the conference calls progresses. By providing each participant with the capability to control the creation and evolution of a conference call, each participant is permitted to move freely from one conference call to another. That is, each participant at his or her endpoint has the ability to "shape" their conference calls to suit their changing needs during the calls. In other words, each participant may split, merge, add, and delete one or more conference calls that may be in progress. In addition, each participant may re-add, re-drop, and remove participants of conferences calls to suit the needs of each of the participants. It should be readily appreciated that additional access control options may limit this symmetric control, in a manner appropriate for the situation. However, in accordance with the contemplated embodiments full symmetric control is generally supported.

Figure 1:
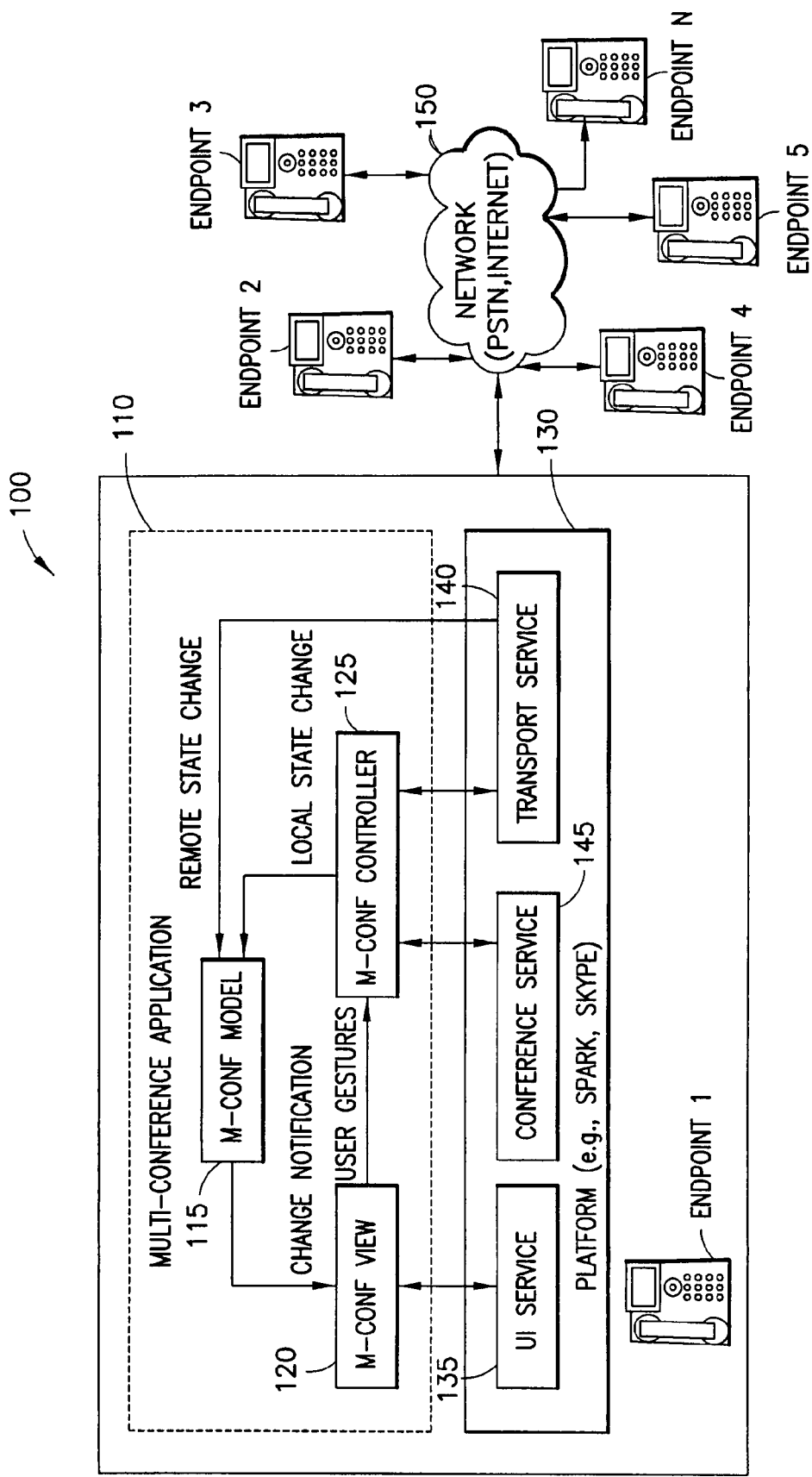
FIG. 1 is a schematic block diagram of an exemplary multi-conferencing system in accordance with an embodiment of the invention.

FIG. 1 is a schematic block diagram of a multi-conferencing system 100 in accordance with an embodiment of the invention. With reference to FIG. 1, the system includes a multi-conference application 110 that comprises an M-Conf Model module 115, an M-Conf View module 120 and an M-Conf Controller module 125. The M-Conf Model module 115 encapsulates or provides a summary of the current state or configuration of the multi-conference topology/model, i.e., who should be part of what call, and notifies the M-Conf View module 120 of changes that occur in the state of the model or topology.

The M-Conf View module 120 renders the model and provides a display on the user interface located at an endpoint, such as Endpoint 1 shown in FIG. 1. It should be readily appreciated that different views are possible, which would change based on the specific device or user interface implemented at each endpoint. The M-Conf View module 120 also provides user inputs or gesture notifications to the M-Conf Controller 125. In addition, the M-Conf View module 120 utilities a user interface (UI) service 135 module of an underlying platform module 130. Such an underlying platform can be either a desk set environment, such as a SIP-based or Skype-based environment, which is implemented in a peer-to-peer environment to provide interactive communication with the user device or interface located at an endpoint of the system. The configuration of the multi-conferencing system of the invention is in accordance with design principles and techniques as described in U.S. application Ser. No. 10/955, 915 and U.S. Serial application Ser. No. 10/955,916, the contents of which are incorporated herein in their entirety.

With additional reference to FIG. 1, M-Conf Controller 125 uses transport service module 140 to communicate with at least one remote endpoint, such as endpoint 2 thru endpoint N. As shown in FIG. 1, communication with the at least one remote endpoint occurs via a network 150, such as the Internet or a public switched telephone network (PSTN). It should be appreciated that even though the PSTN and Internet are shown as one entity, it is also possible for the PSTN network and the Internet to exist separately, where each network would interface to the other. Therefore, it is not the intention of the present invention to be limited to embodiments where the network is comprised solely of the Internet and the PSTN.

Functionally, the M-Conf Controller 125 is internally divided into two sub-components, i.e., a distribution module and a conference host module (not shown). The distribution module processes changes to the view provided on the user device or interface located at an endpoint of the system, such as indicating which conferences to add or delete, and the like. The distribution module also delegates changes to a single conference to the host of the conference (i.e., Conf Host). In accordance with the invention, the Conf Host may be local, i.e., at the same endpoint as the distribution module, or remotely located. In addition, the distribution module accumulates all change results from all conference hosts and updates the models of all local and remote conference participants.

The conference host module updates the conference resources. In the preferred embodiment, the conference resources comprise at least start conference, add participants, drop participants and change participant parameters. The conference host module utilizes conference services 145 pursuant to communicating with the user device at the endpoint. Here, the conference services may be provided by conventional telephone, telephone private branch exchange (PBX), conference server or the like.

Figure 2A:
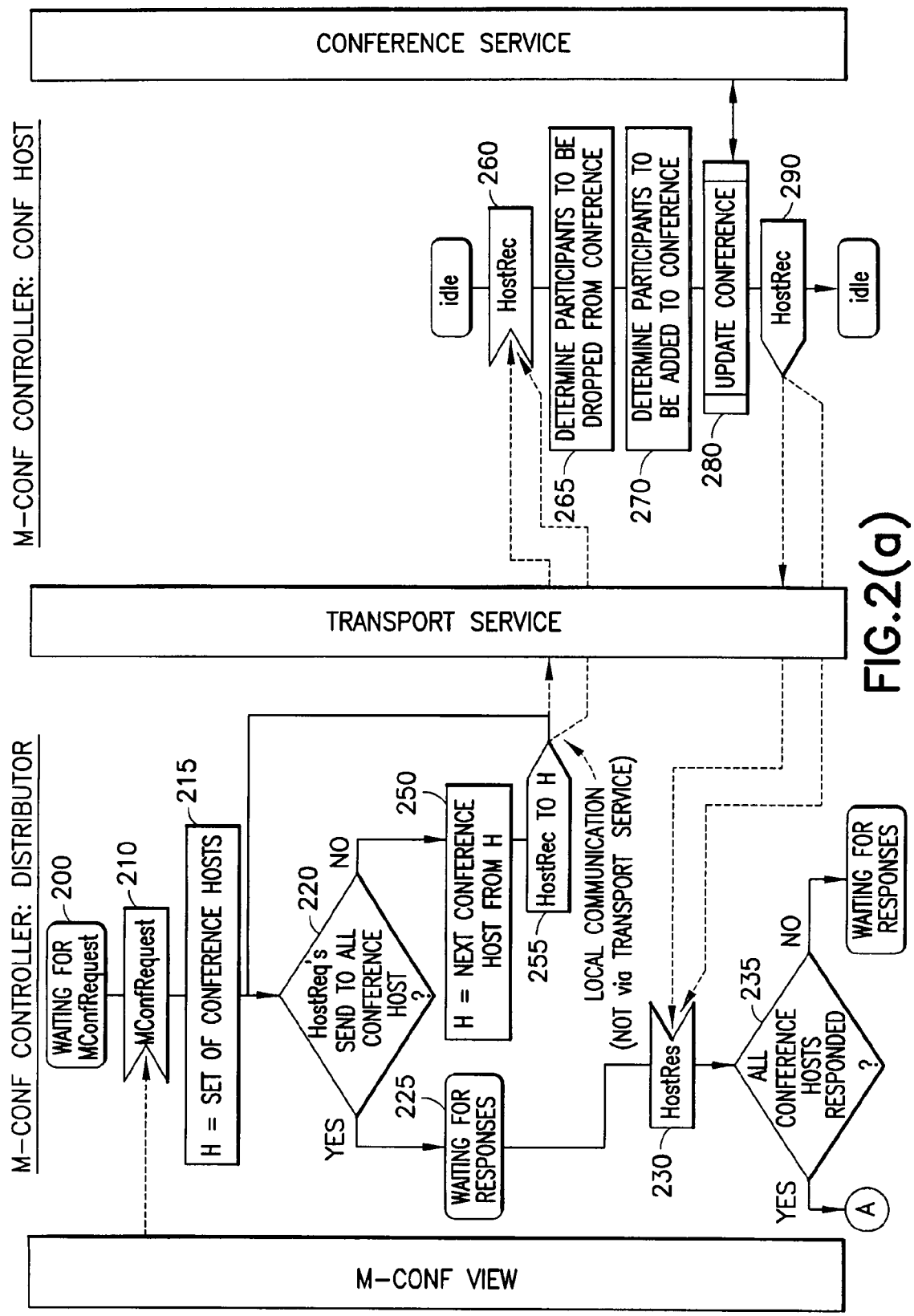
FIGS. 2(a) and 2(b) is an exemplary flow chart illustrating the steps of the method in accordance with an embodiment of the invention.
Figure 2B:
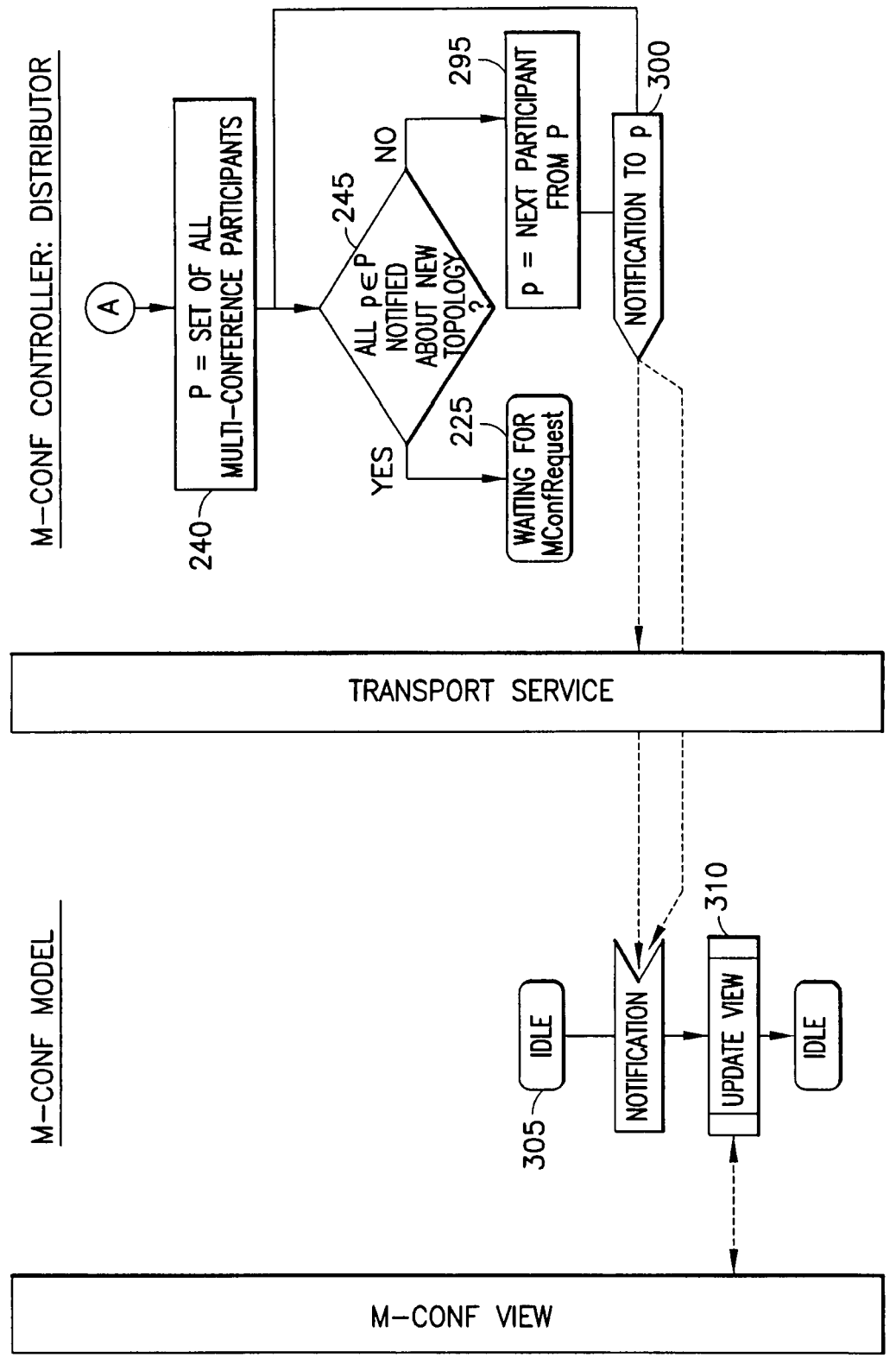
Figure 3B:
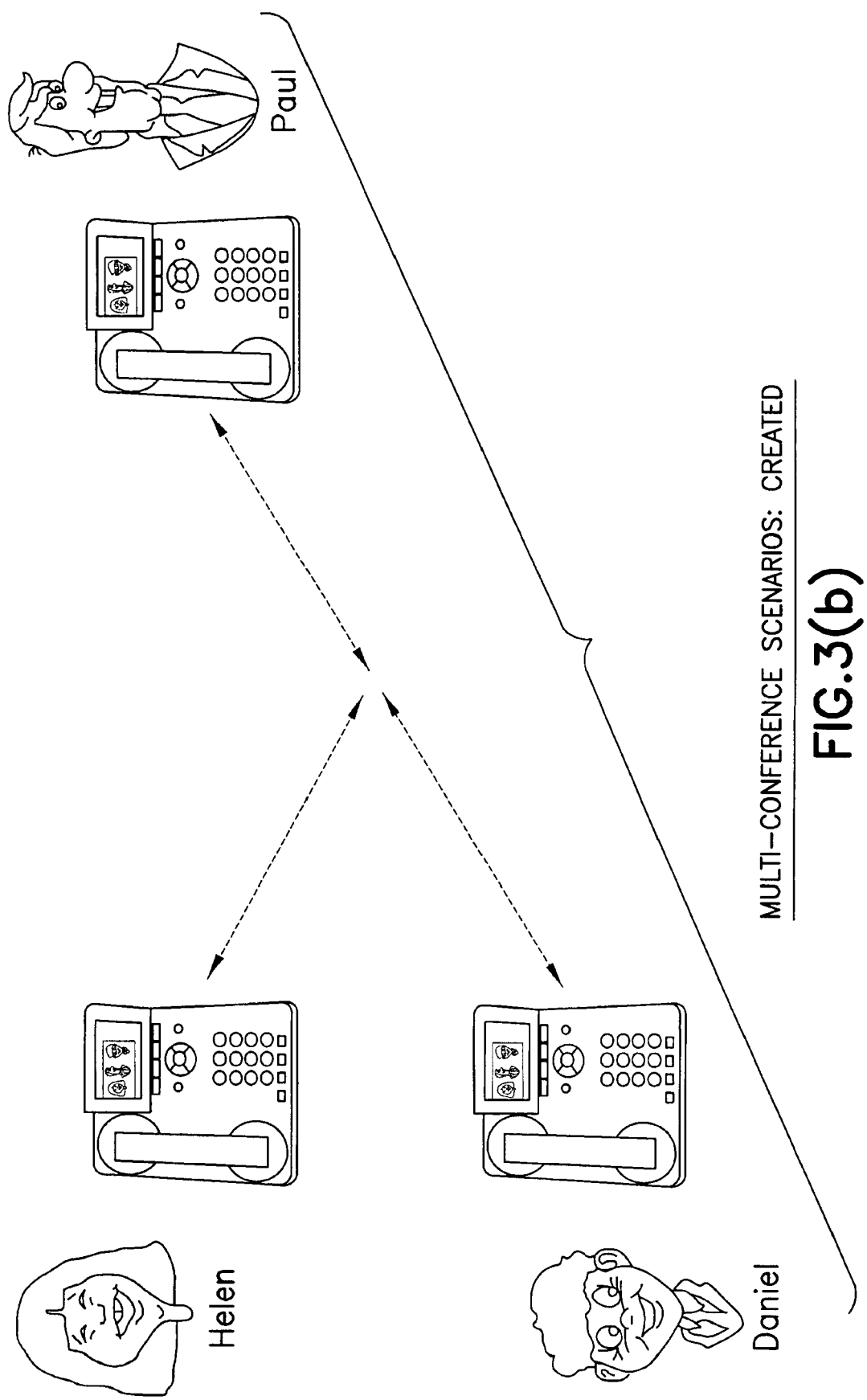
Figure 3D:
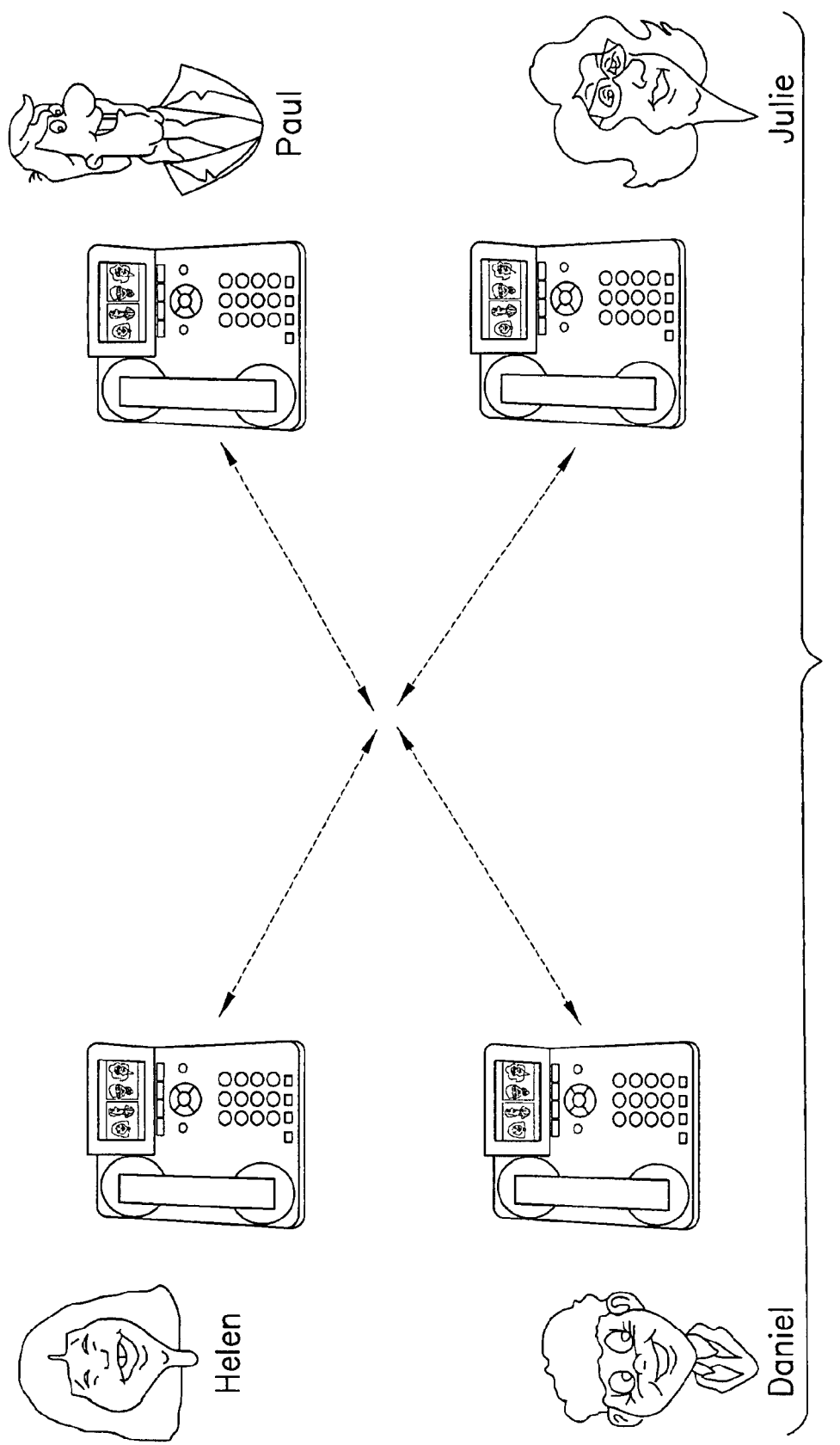
Figure 3E:
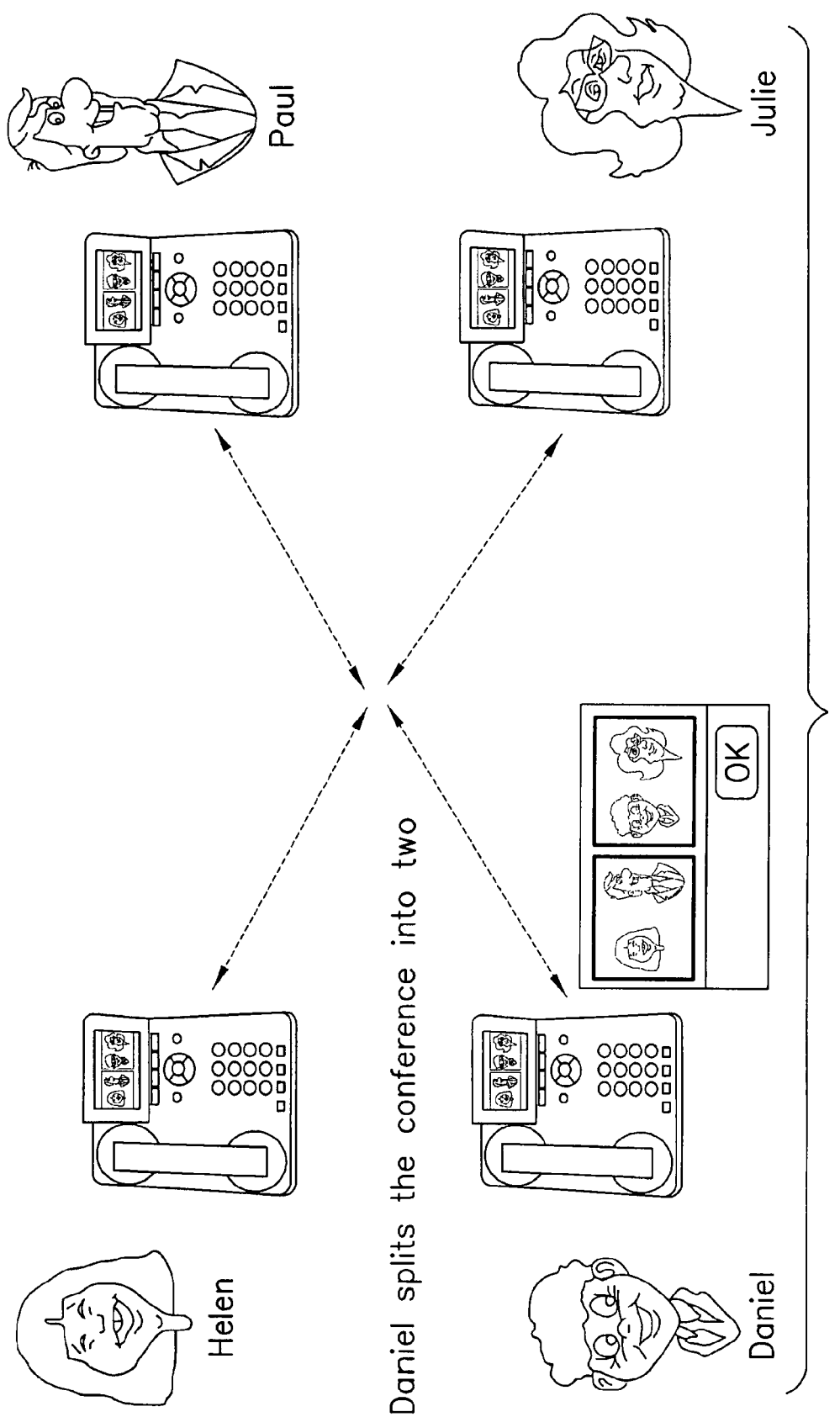
Figure 3H:
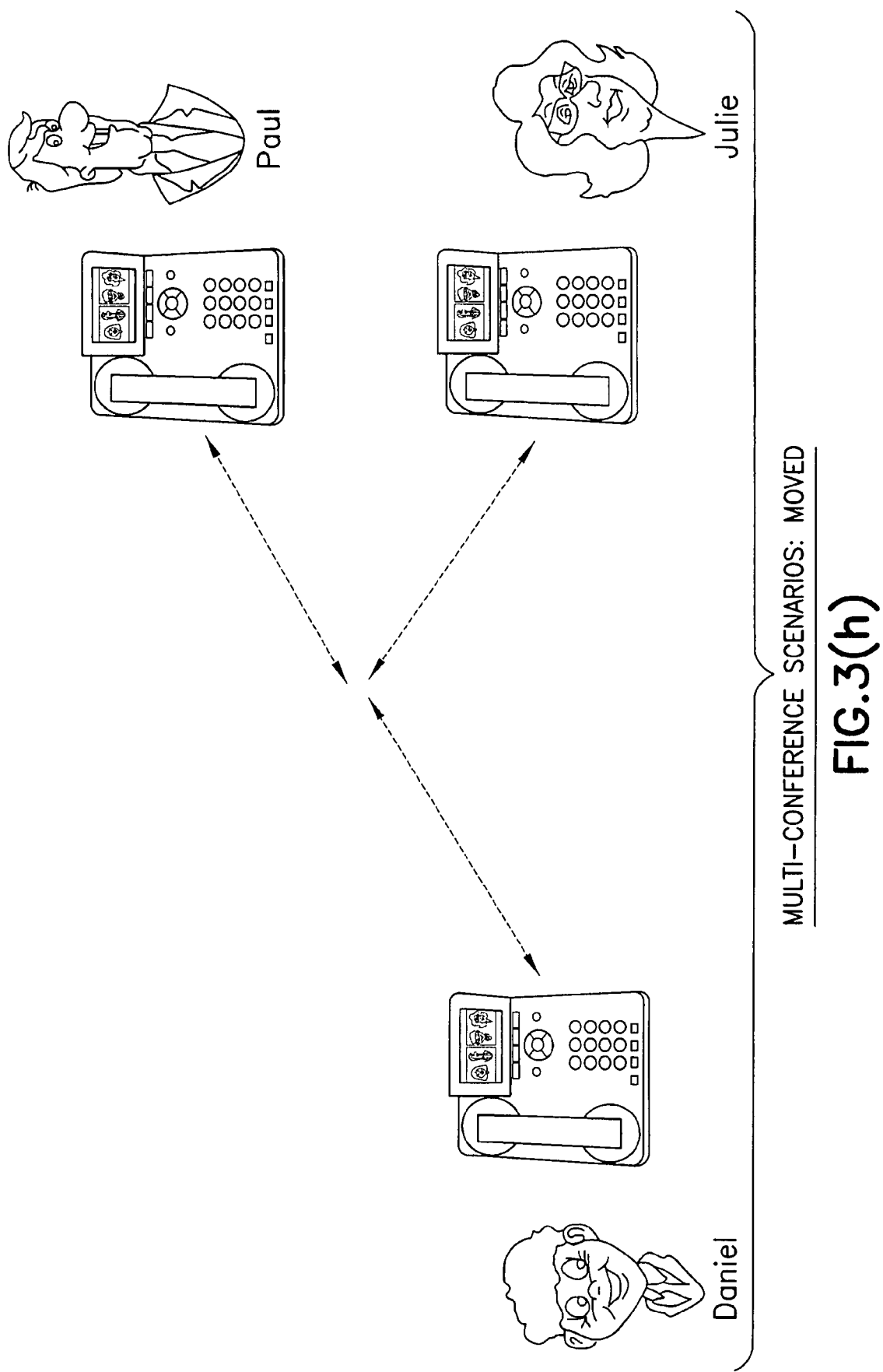

FIGS. 2(a) and 2(b) is an exemplary flow chart illustrating the steps of the method in accordance with the invention. The system is in an idle state and awaits the receipt of requests to initiate a multi-conference (i.e., a MConRequest), as indicated in step 200. During the idle state, MConRequests are received at the distribution module of the M-Conf controller module 125 from the M-Conf View module 120, as indicated in step 210, where H denotes the set of conference hosts (step 215).

Next, a check is performed to determine whether Host Requests (HostReq's) are sent to all conference hosts yet, as indicated in step 220. If HostReq's are sent to all conference hosts, then the system begins waiting for responses from the host (HostRes), as indicated in step 225. As shown in FIG. 2(a), host responses for non-local hosts are received at the distribution module of the M-Conf controller module 125 via the transport service module 140, as indicated in step 230.

Upon receipt of host responses, a check is performed to determined whether all conference hosts have responded to the HostReq's that were sent to all conference hosts, as indicated in step 235. If all the responses were not received, then the system returns to waiting for HostRes's (step 225).

With P denoting the set of all multi-conference participants (step 240), a check is then performed to determine whether all participants in the set P of multi-conference participants have been notified about the new topology/model, as indicated in step 245. If all participants within the set P of all multi-conference participants have been notified about the new topology/model, then the system returns to waiting for MConfRequests (step 200).

With reference to the check that was performed at step 220 to determine whether Host Requests (HostReq's) are sent to all conference hosts, if HostReq's were not sent to all conference hosts, then the next conference host h is selected from the set of conference hosts H, as indicated in step 250. A HostReq is then sent to the next conference host via a local communication path if the host is local, or via the transport service module 140 in the case of a remote host, as indicated in step 255.

The HostReq sent to the next conference host is received and processed by the Conf Host of M-Conf controller 125 during the idle state of the Conf Host, as indicated in step 260. Next, a check is made by the Conf Host to determine which participant to drop from the conference, as indicated in step 265. Next, a check is made by the Conf Host to determine which participant to add to the conference, as indicated in step 270. The conference resources are then updated via the conference services module, as indicated in step 280. A Host Res is then sent (via the transport service or via a local communication path), as indicated in step 290 and a return to the idle state occurs.

With reference to the check that was performed at step 245 to determine whether participants in the set P of multi-conference participants have been notified about the new topology/model, if all participants within the set P of all multi-conference participants have not been notified about the new topology/model, then the next participant p is selected from the set P of multi-conference participants, as indicated in step 295. The notification of the next participant p is forwarded from the distribution module of the M-Conf controller 125 to the M-Conf model 115 via the transport service for use in updating remote user interfaces of the conference participants or directly to the M-Conf model at the same endpoint for local updating of the M-Conf view module of the participant, as indicated in step 300. The M-Conf model module receives the notification from the transport service module 140 during idle states, as indicated in step 305. Next, the view shown to the conference participant on the user device or interface is updated via the M-Conf view module, as indicated in step 310, and a return to the idle state occurs.

FIGS. 3(*a*) thru 3(*h*) is an exemplary block diagram of an embodiment of the method for conference call participants to simultaneously manage multiple conference calls in accordance with the invention. In accordance with the exemplary embodiment, a conference call is established among a team of employees of a company, for example. With reference to FIG. 3(*a*), a first participant H at a first endpoint seeks to create a first conference call that involves a second participant P and a third participant D to discuss a new product, for example. Using her endpoint Graphical User Interface (GUI), which shows potential participants P and D, participant H selects the first conference call and participants P and D, and creates the call with the push of a single button. As shown in FIG. 3(*b*), all participants in the conference call are displayed on the GUI unit at each endpoint. As a result, all of the participants are able to see who is currently participating in the conference on their respective GUI.

Naturally, it will be appreciated that H, P and D converse during the teleconference. In accordance with the exemplary embodiment, a decision is made during the conference call to add an additional participant J to the conference call, as shown in FIG. 3(*c*). Here, participant P can then add a fourth participant J to the first conference call from his endpoint. One reason for P being the participant to add participant J to the conference call is based on convenience, such as because participant J is located in the contact list of participant P. Upon addition of participant J to the conference call, the GUIs of participant H and participant D become updated to show that participant J is an additional participant in the conference call, as shown in FIG. 3(*d*). It should be readily understood that participant H could just as easily be the person to initiate the addition of participants to the conference call.

During the conference call, participant D can split the first conference call into a pair of calls by using his endpoint device when he wishes to conduct a "sidebar" conversation with participant J, as shown in FIG. 3(*e*). Here, the GUI of participant D shows that participants H and P are grouped together and that participants D and J are grouped together to indicate that a split of the first conference call between the participants has occurred. As shown in FIG. 3(*f*), the split of the conference call involves a first call involving participant H and participant P and a second call involving participant D and participant J. In addition, the GUIs of all four participants will show the two conference calls with corresponding participants.

Finally, it is possible to move participant P, who is involved in the conference call with participant H, into the conference call that participant J is involved in by selecting the image of participant P (or any other representation of P such as his or her name) shown on the GUI of participant J, as shown in FIG. 3(*g*). The movement of participant P into her call (e.g., the second conference call) occurs without having to move participant H into the conference call, who is leaving the conference call to attend a meeting, and does so, as indicated in FIG. 3(*h*)). It should be appreciated that participant H was the original initiator of the conference call. However, it is possible for a conference call to continue even though the originator of the conference call may leave the group. The details associated with the apparatus or endpoint device are described in U.S. application Ser. No. 11/904,666, titled Telecommunications Endpoint for Managing Multi-Conferencing, filed Sep. 28, 2007, the contents of which are incorporated herein in its entirety.

Using the multi-conferencing capability of the present invention, the simultaneous management of multiple conferences is permitted, as well as the splitting and merging of conference calls. In addition, symmetric control at the various participating endpoints and a smooth transition of conference participants from one call to another is achieved.

Thus, while we have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing simultaneous management of multiple conference calls, comprising the steps of:
    selecting, by an endpoint device, a conference call identifier on a user interface located at an endpoint of a system, the conference call identifier identifying a selected conference call;
    selecting, by the endpoint device, on the user interface participants to be associated with the selected conference call;
    confirming, by the endpoint device, on the user interface the selection of each participant to be associated with the selected conference call; and
    establishing, by the endpoint device, the conference call among the confirmed participants, said establishing step comprising
        notifying each participant of each of the multiple conference calls about a new topology;
        waiting for receipt of requests to initiate conference calls during an idle state;
        establishing a set of conference hosts upon receipt of a request to initiate the conference calls;
        checking to determine whether host requests are sent to all conference hosts;
        waiting for responses from a conference host if host requests are sent to all the conference hosts;
        checking to determine whether all conference hosts have responded to the host requests;
        establishing a set of all conference call participants;
        checking to determine whether all participants in the set of conference call participants have been notified about the new topology; and
        continuing to await, as necessary, additional receipt of the requests to initiate conference calls.

2. The method of claim 1, wherein requests are received at a distribution module of a controller module from a view module during the idle state.

3. The method of claim 1, wherein host responses are received at the distribution module via a transport service module or locally.

4. The method of claim 1, further comprising returning to said step of waiting for responses from the conference hosts if all the responses were not received.

5. The method of claim 1, further comprising returning to said waiting for receipt of requests if all participants within the set of all conference call participants have been notified about the new topology.

6. The method of claim 1, further comprising the steps of:
    selecting a next conference host from the set of conference hosts if the host requests were not sent to all of the conference hosts; and
    sending the host request to the next conference host via a transport service module or locally.

7. The method of claim 6, further comprising the steps of:
    receiving and processing the host request sent to the next conference host during the idle state of the controller module;
    checking to determine which participant to drop from the conference call;
    checking to determine which participant to add to the conference call;
    updating the conference call via a conference services module;
    sending a host response to the distributor module of the controller module via the transport service module or locally; and
    returning to the idle state.

8. The method of claim 1, further comprising the steps of:
    selecting a next participant from the set of conference call participants if all participants within the set of conference call participants have not been notified about the new topology; and
    forwarding a notification of the next participant from the distribution module of the controller module for use in updating remote user interfaces of the conference call participants.

9. The method of claim 8, further comprising the steps of:
    receiving the notification from the transport service module during the idle state or locally;
    updating a display shown to a conference call participant on the user device via the view module; and
    returning to the idle state.

10. A method for providing simultaneous management of multiple conference calls, comprising the steps of:
    selecting, by an endpoint device, a conference call identifier on a user interface located at an endpoint of a system;
    selecting, by the endpoint device, on the user interface participants to be associated with a selected conference call;
    confirming, by the endpoint device, on the user interface the selection of each participant to be associated with the selected conference call; and
    establishing, by the endpoint device, the conference call among the confirmed participants, said establishing step comprising:
        waiting for receipt of requests to initiate conference calls during an idle state;
        establishing a set of conference hosts upon receipt of a request to initiate the conference calls;
        checking to determine whether host requests are sent to all conference hosts;
        waiting for responses from a conference host if host requests are sent to all the conference hosts;
        checking to determine whether all conference hosts have responded to the host requests;
        establishing a set of all conference call participants;
        checking to determine whether all participants in the set of conference call participants have been notified about a new topology; and
    continuing to await, as necessary, additional receipt of the requests to initiate conference calls.

* * * * *